Oct. 31, 1967      M. T. LEEDS      3,350,498

MULTILAYER CIRCUIT AND METHOD OF MAKING THE SAME

Original Filed Aug. 17, 1961      2 Sheets-Sheet 1

INVENTOR
MICHAEL T. LEEDS
BY HIS ATTORNEYS
HARRIS, KIECH, RUSSELL & KERN

Oct. 31, 1967  M. T. LEEDS  3,350,498
MULTILAYER CIRCUIT AND METHOD OF MAKING THE SAME
Original Filed Aug. 17, 1961
2 Sheets-Sheet 2

INVENTOR
MICHAEL T. LEEDS
BY HIS ATTORNEYS
HARRIS, KIECH, RUSSELL & KERN

United States Patent Office 3,350,498
Patented Oct. 31, 1967

3,350,498
MULTILAYER CIRCUIT AND METHOD OF MAKING THE SAME
Michael T. Leeds, Santa Barbara, Calif., assignor, by mesne assignments, to Intellux Inc., Santa Barbara, Calif., a corporation of California
Continuation of application Ser. No. 132,156, Aug. 17, 1961. This application Jan. 4, 1965, Ser. No. 434,729
9 Claims. (Cl. 174—68.5)

This application is a continuation of my copending application Ser. No. 132,156, filed Aug. 17, 1961, now abandoned.

This invention relates to printed circuits and, in particular, to multilayer circuits and to methods of making such circuits.

Printed circuits are ordinarily two-dimensional in nature and often utilize complex layouts to avoid crossovers of the conductors. Some multilayer circuits have been developed and used but have various size, performance and economic disadvantages. It is an object of the present invention to provide a new multilayer circuit assembly and a process of making such a circuit which is compact, dependable and relatively inexpensive. A further object is to provide such a circuit which is not limited in the number of layers which can be utilized and which will provide firm electrical interconnection as desired between all layers. Applicant is currently producing circuit assemblies having twelve circuit layers.

It is an object of the invention to provide a multilayer circuit having metallurgical bonds at the interconnections of the circuits. A further object is to provide such an assembly in which the overlying circuits are produced by electrodeposition of metal to fix the circuits in place and produce the metallurgical bonding. A further object is to provide a method by which openings of various depths in the insulating layers between the circuits are completely filled with metal which is firmly bonded to each appropriate circuit. In the twelve-layer circuit assembly mentioned above, the over-all thickness of the layers is in the order of 0.070 inch.

It is an object of the invention to provide a multilayer circuit having metal plugs interconnecting circuits which plugs are suitable for drilling for receiving wires and component leads with the metal plugs being homogeneous and anchored in place in the structure. It is another object of the invention to provide a multilayer circuit with insulating layers having reinforcing sheets which also serve to anchor the intercircuit connections in place. Another object is to provide a multilayer circuit which may be prepared on an insulating base and on a conducting base. Another object is to provide a multilayer circuit which may be used in conjunction with additional circuit components or which may be made as an inlaid circuit having a flush surface suitable for switching and commutating applications.

It is a particular object of the invention to provide a process of forming a multilayer circuit including the steps of applying a first circuit of electrical conducting material in a predetermined pattern to a base, applying a coating of insulating material to the first circuit to cover at least those portions of the first circuit which are to be insulated from a second circuit and to leave exposed those portions of the first circuit which are to be electrically connected to the second circuit, applying a thin coating of conducting material over the structure, applying a second circuit of electrical conducting material in a predetermined pattern on the thin conducting coating, and removing the remainder of the thin conducting coating. A further object is to provide such a process which may be repeated to produce a circuit having any desired number of layers.

The invention also comprises novel details of construction and novel process steps which will more fully appear in the course of the following description. The drawings merely show and the description merely describes preferred embodiments of the present invention which are given by way of illustration or example.

Figure 1:
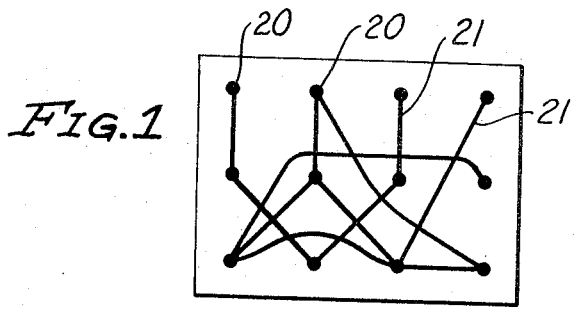
FIG. 1 is a schematic diagram of a typical circuit to be produced by the invention.
Figure 8:
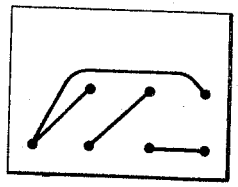
FIGS. 8–10 are diagrams of the individual circuits which are combined to produce the circuit of FIG. 1.
Figure 9:
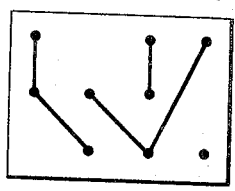
Figure 10:
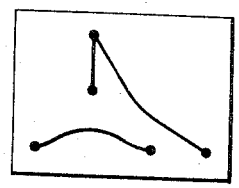

FIG. 1 illustrates an electrical circuit which is to be produced by the process of the invention. The circuit includes a plurality of terminals indicated by dots 20, which terminals are interconnected in a particular pattern by conductors indicated by lines 21. It is required that there be no electrical interconnection between the conductors except at the terminals. Hence a circuit of the configuration of FIG. 1 cannot be produced in a single layer. In the embodiment illustrated herein, the circuit of FIG. 1 is produced in three layers which are separated by insulating coatings. Appropriate steps are performed to produce the required interconnections between the layers. The configuration of the first layer or first circuit is shown in FIG. 8, the configuration of the second layer or circuit is shown in FIG. 9, and the configuration of the third layer or circuit is shown in FIG. 10. Overlying terminals are interconnected through the insulating coatings in a manner to be described below.

In the process illustrated in FIGS. 2–7, a first circuit 24 is applied to an insulating base 25. The base 25 may be a sheet of ceramic or plastic or may be a sheet of metal having an insulating coating on the surface thereof. The first circuit 24 may be applied by conventional methods, such as by an etched foil process or by painting or screening a conducting paste onto the base.

Figure 3:
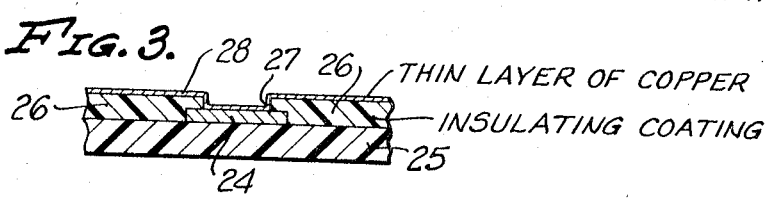

Next an insulating coating 26 is applied to the surface of the structure. The insulating coating is applied in a particular pattern, normally by a spraying or screening process, to cover at least those portions of the first circuit which are to be insulated from the second circuit and to leave exposed those portions of the first circuit which are to be electrically connected to the second circuit. Normally it is easiest to cover substantially the entire surface of the structure except for spots overlying the particular terminals which are to be interconnected with terminals of the second circuit. Typically, the insulating coating 26 will be an epoxy resin paint which is applied in a thickness in the order of 0.006 inch. The resulting coating 26 with an opening 27 therein is seen in FIG. 3.

In the next step, a thin layer of electrically conducting material is applied over the entire surface of the structure. This thin layer is preferably in the order of one micron thick and may be applied by known processes, such as the chemical reduction process, or the vapor deposition process. The chemical reduction process is preferred as it provides a good metallurgical bond with the underlying metal. Ordinarily the thin layer 28 will be of copper but other metals may be used when desired.

After the insulating coating 26 has been applied and after the application of the thin conducting layer 28, the exposed portions of the first circuit 24 may be built up to the level of the coating 26, as by electroplating material in the openings 27 with the remainder of the thin layer masked. This provides a smooth surface for subsequent application of the second circuit.

In the next step, a second circuit 31 is applied on the thin conducting coating 28. Various processes may be used for applying the second circuit. In the embodiment of FIGS. 2–7, a mask 32 is applied over the coating 28 leaving exposed areas corresponding to the second circuit. The second circuit is then deposited by electroplating metal, ordinarily copper, onto the exposed areas of the thin conducting coating 28 to build up the second circuit to the desired thickness. It should be noted that the chemically deposited thin coating 28 will contact the first circuit 24 through the openings in the insulating coating 26 so that the electrodeposited second circuit fills these openings and is metallurgically bonded to the first circuit at the interconnection points. Ordinarily the masking layer 32 is then removed.

The exposed portions of the thin conducting coating 28 are now removed as by chemical etching. Since this coating is only about one micron thick, this etching process does not affect the second circuit which is in the order of three or four thousandths of an inch thick.

In an alternative process for applying the second circuit, a layer of metal may be electroplated onto the thin coating 28 to the desired thickness of the second circuit, usually about three thousandths of an inch. This electrodeposited layer is then masked in a configuration corresponding to the second circuit after which the exposed portions of the electrodeposited layer as well as the thin coating 28 thereunder are removed, as by chemical etching. Then the masking is removed.

Various conventional methods of applying the masking may be utilized, the well-known photographic technique being preferred. In this process, a photosensitive coating is applied to the surface, the photosensitive coating is exposed to light in a predetermined pattern, and is then developed and fixed. The nonactivated portions of the photographic emulsion are washed away leaving a residue which constitutes the mask. The mask itself may be removed by using appropriate solvents. The details of this process are well known and will not be repeated herein.

Figure 5B:
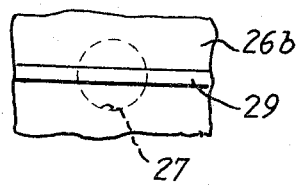
FIG. 5B is a top view of a portion of the porous sheet of FIG. 5A.
Figure 2:
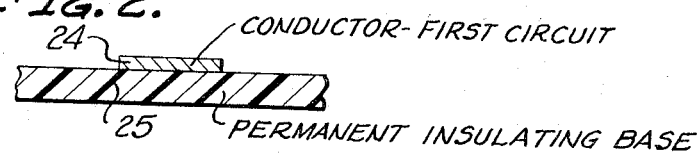
FIGS. 2–7 illustrate steps in the preferred embodiment of the invention.
Figure 5:
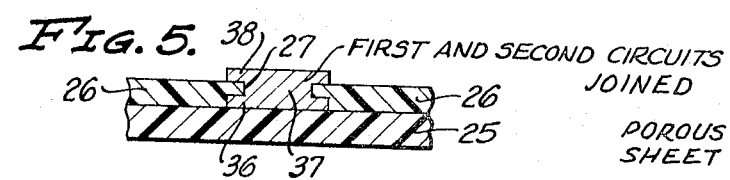

The circuit assembly now has the configuration shown in FIG. 5 and is complete for a two-layer circuit. The first and second circuits have been joined at the opening 27 in the insulating coating 26 by the metallurgical bond produced by electroplating which bonds through the thin coating 28 produced by chemical reduction. The metal plug in FIG. 5 has a large diameter section 36, a small diameter section 37, and another large diameter section 38, the sections 36 and 38 corresponding to terminals 20 of the first and second circuits respectively. The insulating coating 26 extends into the groove provided by the section 37 resulting in a strong mechanical engagement between the various layers constituting the circuit assembly. In a typical unit, the terminal sections 36, 38 will have a diameter of 0.130 inch and the interconnecting section 37 will have a diameter of 0.090 inch. The plug may be drilled to receive a wire or component lead which ordinarily requires a 0.030 inch hole through the plug and the base.

Figure 5A:
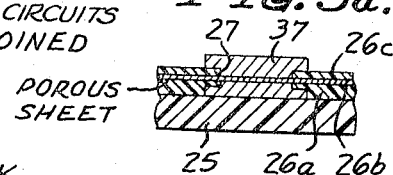
FIG. 5A illustrates an alternate form of the structure of FIG. 5.

The anchoring of the metal plugs may be materially improved by forming the insulating coating 26 in a plurality of layers as shown in FIG. 5A. The insulating coating may be applied by screening a first layer 26A of resin onto the surface, laying a porous sheet 26B onto the screened layer, and screening a second layer 26C of resin onto the porous sheet. The insulating coating is then set or cured in the usual manner. The two resin layers will be laid down in a predetermined pattern as discussed previously, to provide openings for interconnections between the first and second circuits. The porous sheet need not have any pattern formed therein as the chemical reduction process and the electroplating can take place through the porous material.

Typically, a six-thousandths inch thick insulating coating may be formed by screening on a one-thousandth inch layer of resin, laying on a four-thousandths inch thick glass cloth, and screening on another one-thousandth inch layer of resin. The glass cloth will preferably be in the order of 50 to 100 mesh and the electroplated interconnection between the circuits will be formed around the individual fibers of the woven cloth. This type of construction is of particular value where the metal plugs are used as terminals for components and wires which produce mechanical loads on the circuit assembly.

In another alternative, a perforated sheet, such as a sheet of Mylar polyester resin having an all-over punching of relatively small openings or a pattern corresponding to the intercircuit connections can be substituted for the cloth.

The resin layers used for insulating and adhesion may be applied by various methods. A layer may be applied in liquid form by silk screening or brushing. A layer may be formed as a dry, uncured sheet, then punched to the desired pattern and laid in place. In another alternative, the layer may be applied to the porous sheet and dried, prior to placing the porous sheet in position. Such resin layers may be applied to one side or both sides of the porous sheet as desired.

This multiple-layer insulating coating technique may also be used to incorporate an additional circuit layer into the assembly and is particularly useful in providing a terminal structure. For example, the porous sheet 26B may carry one or more conductors 29 which pass or terminate at the openings 27 (FIG. 5B) and are joined to the underlying circuit by the subsequent electroplating operation.

Flexible harnesses are prepared by laminating a very thin sheet of copper to a sheet of glass cloth or Teflon or Mylar film, followed by masking and etching to produce the desired circuit pattern.

In a typical multilayer circuit of the invention, such a flexible harness may be used as part of an insulating coating, with an end of the harness left exposed for external connections. A two-layer circuit can be formed using the first circuit 24 as one layer and a harness as the second layer, with interconnections made by electroplating plugs in the interconnection openings 27.

Figure 4:
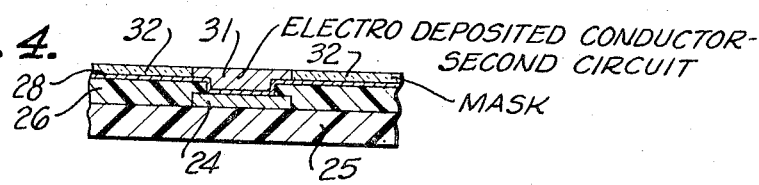
Figure 6:
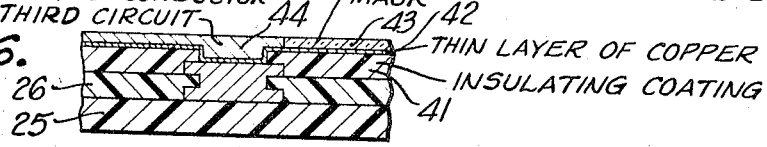
Figure 7:
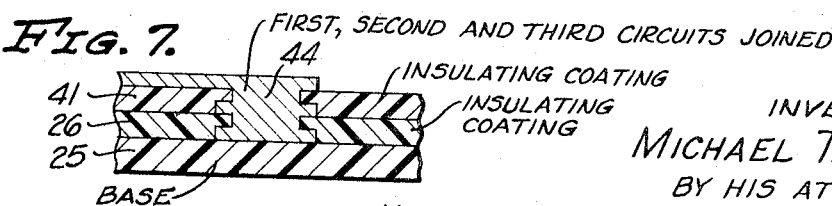

Additional circuits may be formed over the first and second circuits by repeating the process steps of FIGS. 3 and 4, as illustrated in FIGS. 6 and 7. Another insulating coating 41 is applied over the structure of FIG. 5 with openings in the coating at points where the second and third circuits are to be interconnected. Then a thin conducting coating 42 is applied to the structure by chemical reduction and the third circuit 44 is applied in a predetermined pattern, after which the portions of the thin coating 42 not covered by the third circuit are removed. The completed three-layer circuit is shown in FIG. 7. There is no limit on the number of layers of circuits which can be produced by this method. Applicant is presently forming extremely complex circuits with more than two thousand connections and twelve layers of circuits. The circuit assemblies may be produced in quantity and all will be identical since the routing of the conductors is controlled by the predetermined patterns and masks and conductors are not installed individually.

Figure 11:
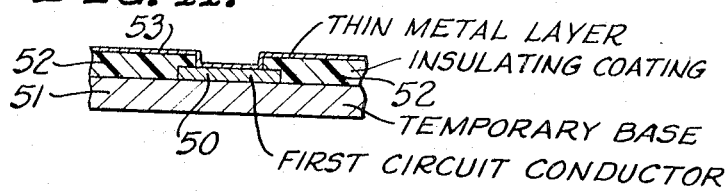
FIGS. 11–14 illustrate steps in an alternative form of the invention.
Figure 12:
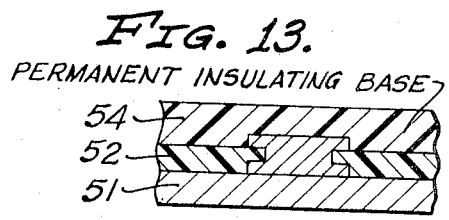
Figure 13:

Another embodiment of the process of the invention is shown in FIGS. 11–14. This process is particularly suited for use in making circuits of the inlaid type having a flush surface for use with moving contacts in switching applications and the like. Referring to FIG. 11, a first circuit 50 is applied to a temporary base 51 by any of the well-known methods. The temporary base 51 may be a sheet of metal, wood, plastic or the like. If formed of a nonconducting material, the base may have a metal film on the surface thereof. When the temporary base has an electrically conducting surface, the first circuit may be applied by electroplating, either through a mask or all over followed by etching to a desired configuration. An insulating coating 52 and a thin conducting coating 53 are applied in the manner described in conjunction with the embodiment of FIGS. 2–7. Then the second circuit may be applied and the remainder of the thin conducting coating removed, as described previously, to produce the structure of FIG. 12.

Figure 14:
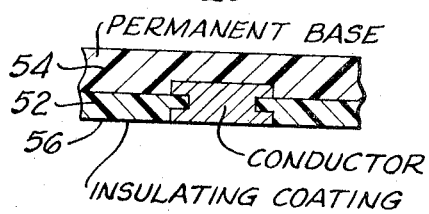

A permanent base or support 54 is then laid over the upper surface of the circuit assembly and the entire structure is subjected to a suitable temperature and pressure to mold the permanent base to the circuit. The permanent base is preferably a sheet of uncured thermosetting plastic material and the molding pressure and temperature are chosen to produce setting of the plastic material and bond the base 54 to the circuit structure. The permanent base with the circuits inlaid therein may then be removed from the temporary base by thermal or mechanical shock or peeling or stripping or chemically dissolving the temporary base. The resultant structure is shown in FIG. 14 with the surface 56 having the conductors flush therewith and being extremely smooth.

Figure 15:
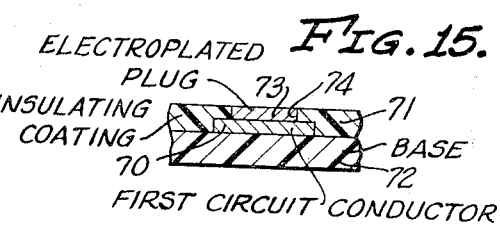
FIGS. 15 and 16 illustrate steps in another embodiment of the invention.
Figure 16:
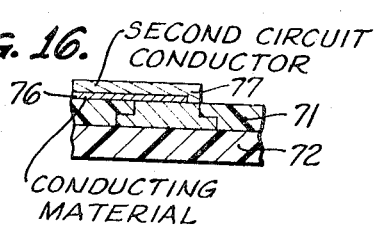

Another embodiment of the invention is shown in FIGS. 15 and 16. In this embodiment, a first circuit conductor 70 and an insulating coating 71 may be applied to a base 72 in the manner previously described. If desired, the exposed surfaces of the first circuit 70 may be raised to substantially the level of the surface of the insulating coating 71 by electroplating metal onto the first circuit conductor to produce a metal plug 73 in the opening 74 of the insulating coating. This step was previously referred to in conjunction with FIG. 3.

In the next step, a conducting material 76 is applied in a predetermined pattern over the surface of the structure. This conducting material defines the second circuit but only partially covers the exposed surfaces of the first circuit. Then the second circuit is applied by electroplating a layer of metal 77 onto the conducting material 76 and onto the remaining exposed portions of the first circuit 70. This operation produces a good metallurgical bond between the first and second circuit conductors regardless of the quality of the bond between the conducting material 76 and the first circuit.

The layer of conducting material 76 may be applied by various known processes. For example, the layer 76 may be applied by painting or screening a conducting paste onto the surface of the unit, followed by drying and, if desired, firing to produce the metallic conducting film. In an alternative mode, an appropriate mask may be applied to the surface of the insulating coating 71 after which the conducting material 76 is applied by chemical reduction or vapor deposition or the like. Then the mask is removed leaving the conducting material in the desired pattern. When applying the conducting material 76 over the exposed surface of the first circuit conductors, it is preferred to cover no more than about one third of the area of each opening exposing the first circuit conductor so that the maximum area is available for the electroplated metallurgical bond.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A process of forming a multilayer electrical circuit, including the steps of:
    applying a first circuit of electrical conducting material in a predetermined pattern to a base;
    applying a coating of insulating material to said first circuit to cover at least those portions of said first circuit which are to be insulated from a second circuit and to leave exposed those portions of said first circuit which are to be electrically connected to the second circuit;
    applying electrical conducting material to said exposed portions of said first circuit to raise the surface of said exposed portions to substantially the level of the surface of said coating of insulating material;
    applying a thin coating of conducting material over said insulating coating;
    applying a second circuit of electrical conducting material in a predetermined pattern on said thin conducting coating;
    and removing the remainder of said thin conducting coating.

2. A process of forming a multilayer electrical circuit, including the steps of:
    applying a first circuit of electrical conducting material in a predetermined pattern to a base;
    applying a coating of insulating material to said first circuit to cover at least those portions of said first circuit which are to be insulated from a second circuit and to leave exposed those portions of said first circuit which are to be electrically connected to the second circuit;
    applying a conducting material in a predetermined pattern on the structure defining a second circuit, with said pattern only partially covering said exposed portions of said first circuit;
    and electroplating metal onto the conducting material and the remaining exposed portions of said first circuit to form the second circuit.

3. A process as defined in claim 2 in which the conducting material defining the second circuit is applied by screening an electrically conductive paste onto the surface and drying the unit to produce a metallic film.

4. A process as defined in claim 2 in which the conducting material defining the second circuit is applied by masking the surface, applying a thin coating of conducting material over the masked surface, and removing the masking material.

5. In a multilayer circuit assembly, the combination of:
    first and second electrical circuits disposed in substantially parallel planes;
    an insulating layer positioned between said circuits, said layer comprising a first film of plastic, a porous sheet, and a second film of plastic, with each of said films having openings at zones where said circuits are to be electrically connected together;
    and a metal plug filling an opening in said insulating layer and integrally connected with the adjoining portions of said first and second circuits.

6. A circuit assembly as defined in claim 5 in which said porous sheet is a cloth woven of electrically nonconducting fiber.

7. A circuit assembly as defined in claim 5 in which said porous sheet is a perforated plastic sheet.

8. In a multilayer circuit assembly, the combination of:
    first and second electrical circuits disposed in substantially parallel planes;
    an insulating layer positioned between said circuits, said layer including a film of plastic and a porous sheet carrying a third electrical circuit, with said film having openings at zones where at least two of said circuits are to be electrically connected together;
    and a metal plug filling an opening in said insulating layer and integrally connected with the adjoining portions of said first and second circuits.

9. In a multilayer circuit assembly, the combination of:
- a first electrical circuit;
- a first layer of insulating material overlying said first circuit, said first layer having openings at zones where said first circuit is to be electrically connected to a second circuit;
- a porous sheet of insulating material positioned on said first layer and carrying a second electrical circuit, with said second circuit overlying said openings, and with a portion of said sheet and second circuit extending beyond said first circuit;
- and metal plugs filling said openings and integrally connected with portions of said first and second circuits.

References Cited

UNITED STATES PATENTS 2,721,822  10/1955  Pritikin.
3,142,112   7/1964  Burkig et al. _____ 174—68.5 X

OTHER REFERENCES

Klippel: "Method for Producing Three Dimensional Printed Circuits," published in IBM Technical Disclosure Bulletin, vol. 2, No. 4, December 1959, pages 7 and 8.

"Printed Assemblies," published in Tele-Tech & Electronic Industries, December 1954, page 101.

DARRELL L. CLAY, *Primary Examiner.*

LEWIS H. MYERS, ROBERT K. SCHAEFER,
*Examiners.*